(12) United States Patent
Saji et al.

(10) Patent No.: US 8,706,056 B2
(45) Date of Patent: Apr. 22, 2014

(54) HIGH-FREQUENCY CIRCUIT MODULE

(71) Applicant: Taiyo Yuden Co., Ltd., Tokyo (JP)

(72) Inventors: Tetsuo Saji, Tokyo (JP); Hiroshi Nakamura, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 14/056,721

(22) Filed: Oct. 17, 2013

(65) Prior Publication Data

US 2014/0051368 A1    Feb. 20, 2014

Related U.S. Application Data

(62) Division of application No. 13/966,517, filed on Aug. 14, 2013.

(30) Foreign Application Priority Data

Aug. 16, 2012   (JP) ................................ 2012-180527

(51) Int. Cl.
  *H04B 1/44*   (2006.01)
(52) U.S. Cl.
  USPC .............................. 455/78; 455/307; 455/333
(58) Field of Classification Search
  USPC ............. 455/78, 83, 296, 307, 313, 323, 333, 455/334, 550.1
  See application file for complete search history.

(56) References Cited

U.S. PATENT DOCUMENTS 6,633,748 B1 * 10/2003 Watanabe et al. ................ 455/78
7,373,171 B2 * 5/2008 Nakai ......................... 455/552.1

(Continued)

FOREIGN PATENT DOCUMENTS

JP    2002-344146 A    11/2002
JP    2005-277939 A    10/2005

(Continued)

OTHER PUBLICATIONS

Japanese Office Action dated Sep. 18, 2012, in a counterpart Japanese patent application No. 2012-180527. (Cited in the U.S. Appl. No. 13/966,517 and the related U.S. Appl. No. 14/056,758, U.S. Appl. No. 14/058,014, and U.S. Appl. No. 14/058,035, and the related U.S. Patent No. 8,483,104.)

(Continued)

*Primary Examiner* — Nhan Le
(74) *Attorney, Agent, or Firm* — Chen Yoshimura LLP (57) ABSTRACT

Provided is a high-frequency module that can prevent a transmission signal from reaching a reception circuit and that can achieve high mounting density. A first duplexer for a first frequency band is mounted on a circuit substrate, and a second transmission filter and a second reception filter that constitute a second duplexer for a second frequency band are embedded in the circuit substrate. The second transmission filter and the second reception filter are embedded in the circuit substrate in locations that overlap at least a part of a projection region that is formed by projecting the first duplexer in a thickness direction of the circuit substrate. The first frequency band and the second frequency band are separated from each other by at least a prescribed frequency range.

26 Claims, 3 Drawing Sheets

(56) References Cited

U.S. PATENT DOCUMENTS

| | | | |
|---|---|---|---|
| 7,471,930 B2 * | 12/2008 | Okuyama et al. | 455/78 |
| 7,773,956 B2 | 8/2010 | Fukamachi et al. | |
| 8,391,821 B2 * | 3/2013 | Okabe | 455/323 |
| 8,467,740 B2 * | 6/2013 | Uejima | 455/78 |
| 8,483,104 B1 | 7/2013 | Saji et al. | |
| 8,558,641 B2 | 10/2013 | Murase et al. | |
| 2005/0264375 A1 | 12/2005 | Ikuta et al. | |
| 2010/0091752 A1 | 4/2010 | Kemmochi et al. | |
| 2012/0081192 A1 | 4/2012 | Hanaoka | |

FOREIGN PATENT DOCUMENTS

| | | |
|---|---|---|
| JP | 2006-203652 A | 8/2006 |
| JP | 2008-010995 A | 1/2008 |
| JP | 2010-161801 A | 7/2010 |

OTHER PUBLICATIONS

U.S. Appl. No. 14/056,758, filed Oct. 17, 2013, and U.S. Appl. No. 14/058,014 and U.S. Appl. No. 14/058,035, filed Oct. 18, 2013, and U.S. Patent No. 8,483,104.

Japanese Office Action dated Sep. 18, 2013, in a counterpart Japanese patent application No. 2013-178324.

Japanese Office Action dated Sep. 18, 2013, in a counterpart Japanese patent application No. 2013-178327 of the related U.S. Appl. No. 14/056,758.

Japanese Office Action dated Sep. 18, 2013, in a counterpart Japanese patent application No. 2013-178328 of the related U.S. Appl. No. 14/058,014.

Japanese Office Action dated Sep. 18, 2013, in a counterpart Japanese patent application No. 2013-178329 of the related U.S. Appl. No. 14/058,035.

* cited by examiner

HIGH-FREQUENCY CIRCUIT MODULE

This application is a Divisional Application of a pending application, U.S. application Ser. No. 13/966,517 filed on Aug. 14, 2013 and claims the benefit of Japanese Application No. 2012-180527, filed in Japan on Aug. 16, 2012, both of which are hereby incorporated by reference in their entireties.

TECHNICAL FIELD

The present invention relates to a high-frequency circuit module having a high-frequency circuit mounted on a circuit substrate thereof, and more particularly, to a mounting structure of a transmission filter that filters a high-frequency signal outputted from a transmission circuit and a reception filter that filters a high-frequency signal inputted into a reception circuit.

BACKGROUND ART

In recent years, mobile phones are becoming more sophisticated and smaller as represented by multi-function mobile phones, i.e., smart phones. In such mobile phones, a high-frequency circuit module, in which various components that are necessary for transmitting and receiving high-frequency signals are mounted on a circuit substrate thereof, is provided on a mother board (see Patent Document 1, for example). In the high-frequency circuit module described in Patent Document 1, a power amplifier IC, a transmission filter, a reception filter, and the like are provided on the circuit substrate. Inside the circuit substrate, passive components such as capacitors that constitute a matching circuit and the like are embedded. The high-frequency circuit module described in Patent Document 1 is provided with two transmission/reception systems respectively for the cellular system 800 MHz band and for the PCS (Personal Communication Services) system 1.9 GHz band, and one reception system for the 1.5 GHz band that is the reception band of GPS (Global Positioning System) so as to enable the positioning function that utilizes GPS.

RELATED ART DOCUMENTS

Patent Documents

Patent Document 1: Japanese Patent Application Laid-Open Publication No. 2005-277939

SUMMARY OF THE INVENTION

Problems to be Solved by the Invention

The high-frequency circuit module described in Patent Document 1 is equipped with the transmission/reception systems for the two frequency bands as described above, but in recent years, there have been demands for a capability of handling a greater number of frequency bands and further size reduction. However, the configuration described in Patent Document 1 did not allow a plurality of transmission/reception systems for various frequency bands to be mounted in high density. The transmission filter and the reception filter, in particular, cause a problem because they require relatively large mounting areas, and they are likely to cause a transmission signal to interfere with the reception circuit. The latter is a phenomenon that occurs when a high-frequency signal that has been transmitted through the first transmission/reception system enters the reception circuit through the second transmission/reception system. This phenomenon is caused as a result of the frequency bands of a plurality of transmission/reception systems partially overlapping or being close to each other. The following case can be given as a specific example: let's assume that the transmission band in the frequency range of the first transmission/reception system overlaps the reception band in the frequency range of the second transmission/reception system, and a duplexer of the first transmission/reception system and a duplexer of the second transmission/reception system are mounted on a circuit substrate adjacently to each other. In this case, when the communication is performed using the first transmission/reception system, the transmission signal is directly coupled with the reception filter of the duplexer of the second transmission/reception system through the electromagnetic coupling, or is electromagnetically coupled with antenna wiring. This causes the transmission signal to flow into the reception filter of the duplexer of the second transmission/reception system, and subsequently flow into the reception circuit through the reception filter. In recent mounting techniques, the reception circuits of the first transmission/reception system and the second transmission/reception system are often included in a common integrated circuit. Therefore, in a vicinity of the integrated circuit, the transmission signal that has passed through the reception filter of the duplexer and that flows through the reception wiring of the second transmission/reception system may be electromagnetically coupled with wiring of the first transmission/reception system, and may flow into the reception circuit of the first transmission/reception system of the integrated circuit.

The present invention was made in view of the above-mentioned problems, and aims at providing a high-frequency circuit module that can prevent the loop interference of the transmission signal with the reception circuit and that can achieve high mounting density.

Means for Solving the Problems

In order to achieve the above object, a high-frequency circuit module according to the present invention includes: a circuit substrate provided with a transmission circuit and a reception circuit for a high-frequency signal; a first transmission filter that performs filtering in a first frequency band on a signal outputted from the transmission circuit and a first reception filter that performs filtering in the first frequency band on a signal inputted into the reception circuit; and a second transmission filter that performs filtering in a second frequency band on a signal outputted from the transmission circuit and a second reception filter that performs filtering in the second frequency band on a signal inputted into the reception circuit, wherein the first frequency band and the second frequency band are separated from each other by at least a prescribed frequency range therebetween, wherein the first transmission filter and the first reception filter are mounted on the circuit substrate, and wherein the second transmission filter and the second reception filter are embedded in the circuit substrate so as to overlap at least a part of the first transmission filter and the first reception filter when viewed in a plan view.

In the present invention, the first transmission filter and the first reception filter are mounted on the circuit substrate. On the other hand, the second transmission filter and the second reception filter are embedded in the circuit substrate. The second transmission filter and the second reception filter are embedded so as to overlap at least a part of the projection region that is formed by projecting the first transmission filter and the first reception filter in the thickness direction of the circuit substrate. That is, the first transmission filter and the first reception filter are in a relatively close vicinity of the second transmission filter and the second reception filter. In the present invention, because the first frequency band and the second frequency band are separated from each other by at least a prescribed frequency range therebetween, the transmission signal passing through the first transmission filter can be prevented from being electromagnetically coupled with the second reception filter. Similarly, the transmission signal passing through the second transmission filter can be prevented from being electromagnetically coupled with the first reception filter. This makes it possible to achieve both the improvement in mounting density and the prevention of the loop interference of the transmission signal with the reception circuit.

In one preferred exemplary configuration of the present invention, the circuit substrate may include a ground conductive layer formed between the first transmission filter and the first reception filter and between the second transmission filter and the first reception filter. With this ground conductive layer, the loop interference of the transmission signal can be prevented more effectively.

In an exemplary configuration of the present invention, the first transmission filter and the first reception filter constitute a first duplexer circuit, and the second transmission filter and the second reception filter constitute a second duplexer circuit. In this case, in order to ensure the isolation of the transmitter from the receiver and to improve the mounting density, it is preferable that the first duplexer circuit be enclosed in a package, that the package be mounted on the circuit substrate, and that the second transmission filter and the second reception filter be embedded in the circuit substrate as separate components. The term "duplexer circuit" used here refers to a circuit that electrically isolates a transmission signal from a reception signal to allow a common antenna to be used for both the transmission and reception in the wireless communication technology of the FDD (Frequency Division Duplex) scheme. This circuit is also referred to as an "antenna sharing circuit." A device that electrically isolates two frequency bands from each other is generally called a duplexer.

In another preferred exemplary configuration of the present invention, the high-frequency circuit module may additionally include a third transmission filter that performs filtering in a third frequency band on a signal outputted from the transmission circuit and a third reception filter that performs filtering in the third frequency band on a signal inputted into the reception circuit, wherein the first frequency band and the third frequency band partially overlap, or are close to each other, and wherein the third transmission filter and the third reception filter are mounted on the circuit substrate so as to be at least a prescribed distance away from the first transmission filter and the first reception filter.

In another preferred exemplary configuration of the present invention, the high-frequency circuit module may additionally include a fourth transmission filter that performs filtering in a fourth frequency band on a signal outputted from the transmission circuit and a fourth reception filter that performs filtering in the fourth frequency band on a signal inputted into the reception circuit, wherein the second frequency band and the fourth frequency band partially overlap, or are close to each other, and wherein the fourth transmission filter and the fourth reception filter are embedded in the circuit substrate so as to be at least a prescribed distance away from the second transmission filter and the second reception filter.

Also, a high-frequency circuit module of the present invention includes: a circuit substrate having mounted thereon a transmission circuit and a reception circuit for a high-frequency signal; a first transmission filter that performs filtering in a first frequency band on a signal outputted from the transmission circuit; and a second reception filter that performs filtering in a second frequency band on a signal inputted into the reception circuit, wherein the first frequency band and the second frequency band are separated from each other by at least a prescribed frequency range therebetween, wherein the first transmission filter is mounted on the circuit substrate, wherein the second reception filter is embedded in the circuit substrate so as to overlap at least some of a the first transmission filter in a plan view, and wherein the second reception filter is made of an acoustic wave filter.

In the present invention, the first transmission filter is mounted on the circuit substrate. On the other hand, the second reception filter is installed in the circuit substrate. Also, the second reception filter is embedded so as to overlap at least a part of a projection region formed when projecting the first transmission filter in a thickness direction of the circuit substrate. In other words, the first transmission filter and the second reception filter are relatively close to each other in distance. In the present invention, by providing at least a prescribed frequency range between the first frequency band and the second frequency band, the transmission signal passing through the first transmission filter can be prevented from being electrically coupled with the second reception filter. As a result, an increase in mounting density is attained while preventing the transmission signal from entering the reception circuit.

Also, a high-frequency circuit module of the present invention includes: a circuit substrate having mounted thereon a transmission circuit and a reception circuit for a high-frequency signal; a first reception filter that performs filtering in a first frequency band on a signal inputted into the reception circuit; and a second transmission filter that performs filtering in a second frequency band on a signal outputted from the transmission circuit, wherein the first frequency band and the second frequency band are separated from each other by at least a prescribed frequency range therebetween, wherein the first reception filter is mounted on the circuit substrate, wherein the second transmission filter is embedded in the circuit substrate so as to overlap at least a part of a projection region formed when projecting the first reception filter in a thickness direction of the circuit substrate, and wherein the second transmission filter is made of an acoustic wave filter.

In the present invention, the first reception filter is mounted on the circuit substrate. On the other hand, the second transmission filter is installed in the circuit substrate. Also, the second transmission filter is embedded so as to overlap at least a part of a projection region formed when projecting the first reception filter in a thickness direction of the circuit substrate. In other words, the first reception filter and the second transmission filter are relatively close to each other in distance. In the present invention, by providing at least a prescribed frequency range between the first frequency band and the second frequency band, the transmission signal passing through the second transmission filter is prevented from being electrically coupled with the first reception filter. As a result, an increase in mounting density is attained while preventing the transmission signal from entering the reception circuit.

Effects of the Invention

As described above, according to the present invention, the first transmission filter and the first reception filter for the first frequency band are mounted on the circuit substrate, and the second transmission filter and the second reception filter for the second frequency band are embedded in the circuit substrate, and therefore, it is possible to improve the mounting efficiency. Further, because the first frequency band and the second frequency band are separated from each other by at least a prescribed frequency range therebetween, the loop interference of the transmission signal with the reception circuit can be prevented.

DETAILED DESCRIPTION OF EMBODIMENTS

Figure 1:
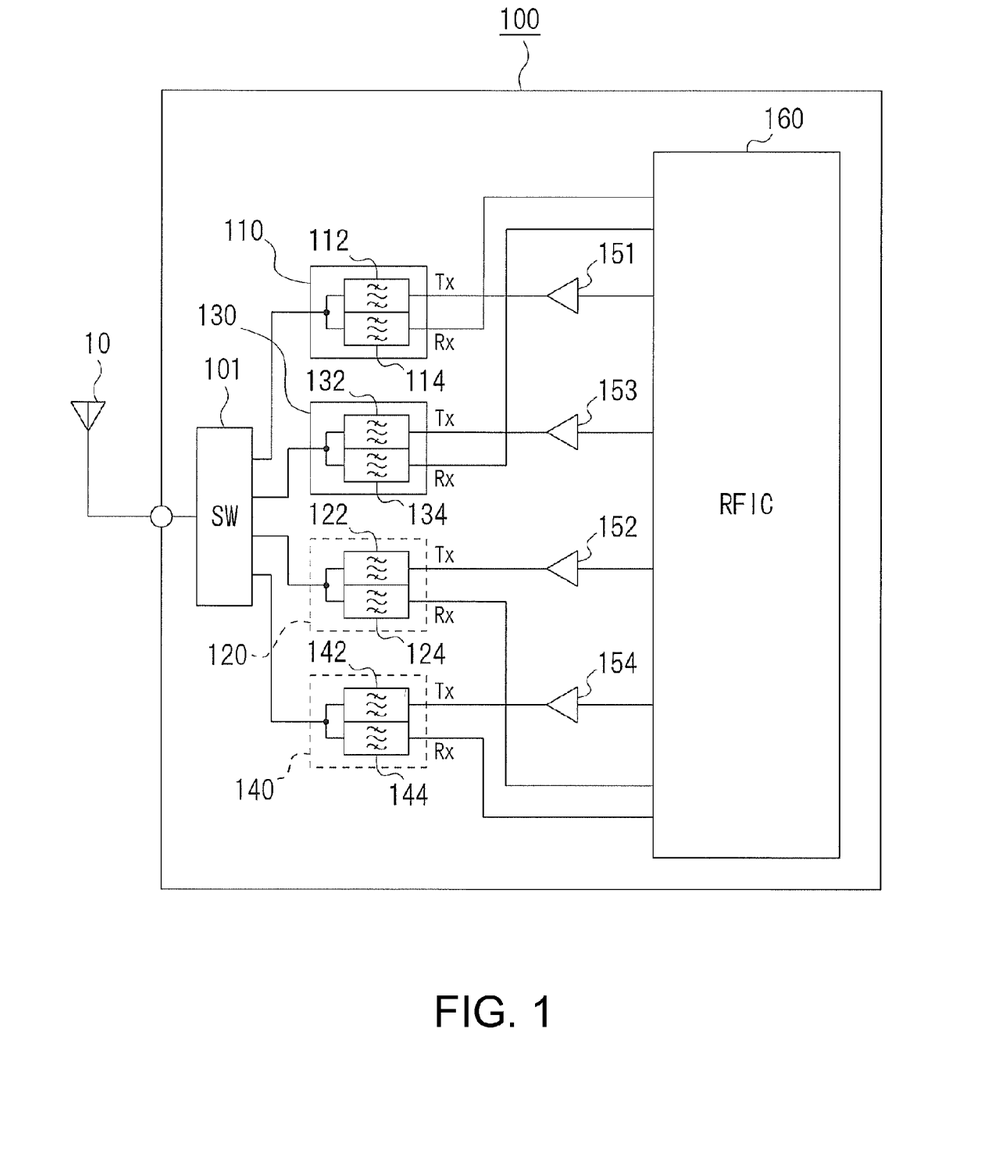
FIG. 1 is a schematic circuit diagram of a high-frequency circuit module.

A high-frequency circuit module according to Embodiment 1 of the present invention will be explained with reference to figures. FIG. 1 is a schematic circuit diagram of the high-frequency circuit module. In the present embodiment, for ease of explanation, configurations concerning the gist of the present invention will be mainly explained.

A high-frequency circuit module 100 according to the present embodiment is used for a mobile phone that is capable of handling four frequency bands. As shown in FIG. 1, the high-frequency circuit module 100 includes a high-frequency switch 101, first to fourth duplexers 110, 120, 130, and 140, high-frequency power amplifiers 151 to 154 for transmission, and an RFIC (Radio Frequency Integrated Circuit) 160. In the actual circuit configuration, a matching circuit, a bandpass filter for transmission signals, and the like are provided for each frequency band, but they are omitted in the present embodiment for ease of explanation.

The high-frequency switch 101 switches connections from the respective first to fourth duplexers 110 to 140 to an external antenna 10.

The respective duplexers 110 to 140 include transmission filters 112, 122, 132, and 142 and reception filters 114, 124, 134, and 144, respectively. As the transmission filters 112, 122, 132, and 142 and the reception filters 114, 124, 134, and 144, various filters such as surface acoustic wave (SAW) filters and bulk acoustic wave (BAW) filters can be used. In the present embodiment, the SAW filters are used. The transmission filters 112, 122, 132, and 142 are connected to transmission ports of the RFIC 160 through the high-frequency power amplifiers 151 to 154, respectively. The reception filters 114, 124, 134, and 144 are connected to reception ports of the RFIC 160.

The RFIC 160 performs a modulation/demodulation process, a multiplexing process, and the like to high-frequency signals. The reception ports of the RFIC 160 that are respectively connected to the first and third duplexers 110 and 130 are adjacent to each other. The reception ports of the RFIC 160 that are respectively connected to the second and fourth duplexers 120 and 140 are adjacent to each other.

As described above, the high-frequency circuit module 100 of the present embodiment is capable of handling four frequency bands, and the duplexers 110 to 140 respectively filter high-frequency signals such that only the signals of the corresponding frequency bands can pass through.

Specifically, the first duplexer 110 is provided for W-CDMA (Wideband Code Division Multiple Access) or LTE (Long Term Evolution) on the 2100 MHz band. The first transmission filter 112 is a 1920 to 1980 MHz bandpass filter, and the first reception filter 114 is a 2110 to 2170 MHz bandpass filter.

The second duplexer 120 is provided for W-CDMA or LTE on the 900 MHz band. The second transmission filter 122 is an 880 to 915 MHz bandpass filter, and the second reception filter 124 is a 925 to 960 MHz bandpass filter.

The third duplexer 130 is provided for W-CDMA or LTE on the 1900 MHz band. The third transmission filter 132 is a 1850 to 1910 MHz bandpass filter, and the third reception filter 134 is a 1930 to 1990 MHz bandpass filter. The transmission frequency range of the first duplexer 110 and the reception frequency range of the third duplexer 130 partially overlap.

The fourth duplexer 140 is provided for W-CDMA or LTE on the 850 MHz band. The fourth transmission filter 142 is an 824 to 849 MHz bandpass filter, and the fourth reception filter 144 is an 869 to 894 MHz bandpass filter. The reception frequency range of the fourth duplexer 140 and the transmission frequency range of the second duplexer 120 partially overlap.

Figure 2:
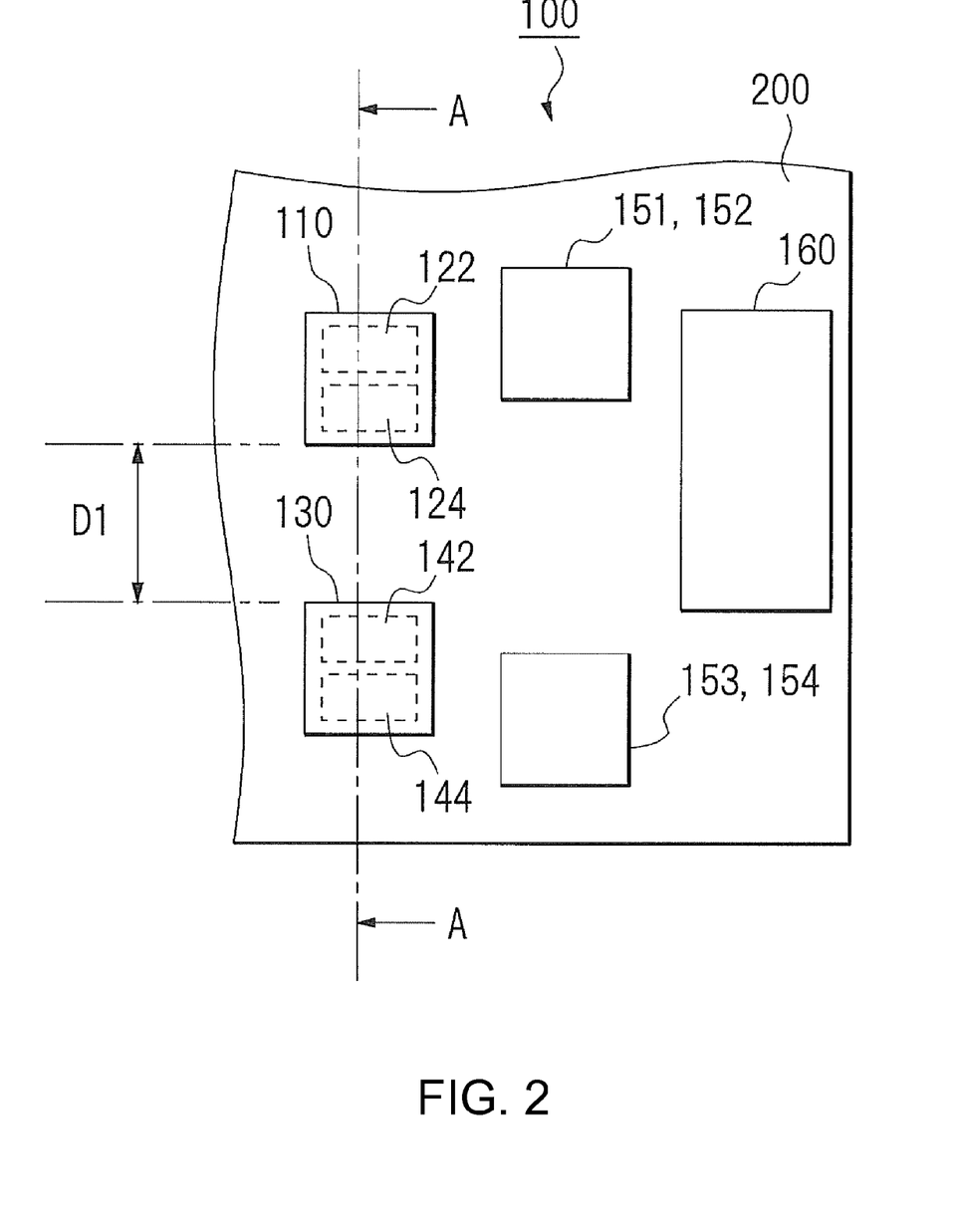
FIG. 2 is a top view of the high-frequency circuit module.

Next, with reference to FIGS. 2 and 3, a structure of the high-frequency circuit module 100 will be explained. FIG. 2 is a top view of the high-frequency circuit module, and FIG. 3 is a cross-sectional view along the line indicated by the arrows A in FIG. 2.

Figure 3:
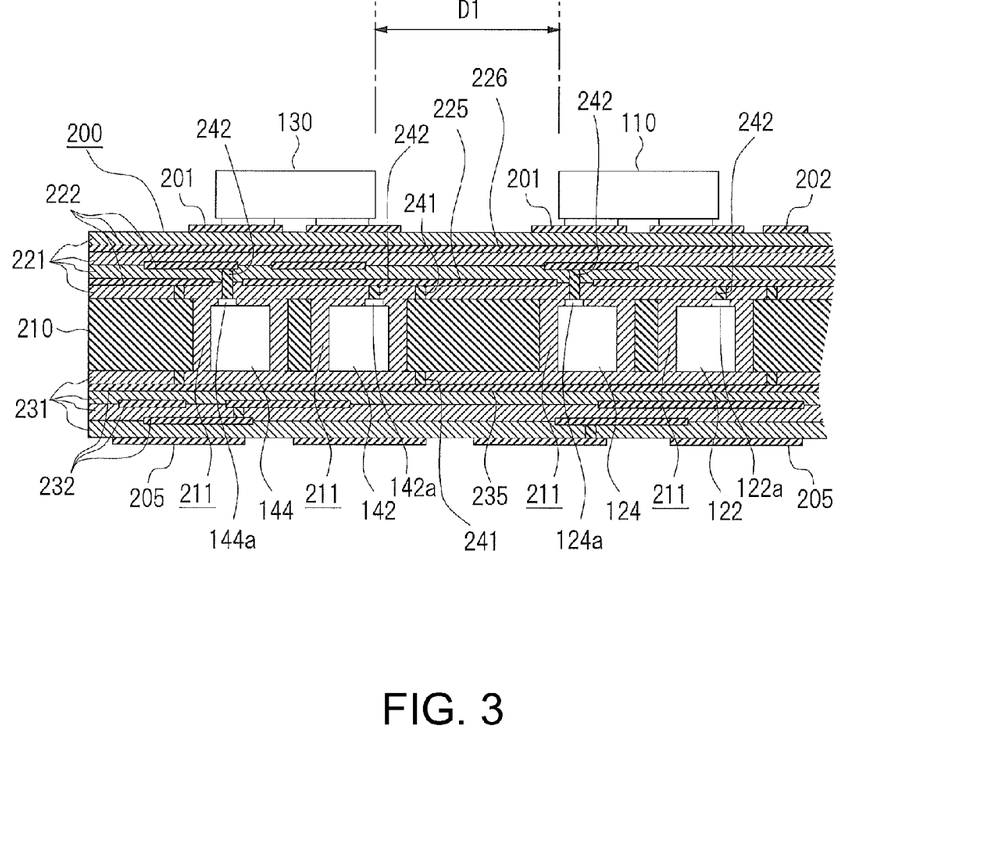
FIG. 3 is a cross-sectional view of the high-frequency circuit module.

As shown in FIGS. 2 and 3, in the high-frequency circuit module 100, the RFIC 160, the first duplexer 110, and the third duplexer 130 are surface-mounted on the top surface of the circuit substrate 200. The first duplexer 110 is configured such that the first transmission filter 112 and the first reception filter 114 are enclosed in a package for surface mounting. The third duplexer 130 is configured in the same manner. On the other hand, the second duplexer 120 and the fourth duplexer 140 are embedded in the circuit substrate 200. The second duplexer 120 and the fourth duplexer 140 are configured such that some of the constituting elements thereof (such as transmission filters and reception filters) are embedded in the circuit substrate 200 as separate components, respectively. That is, it should be noted that the second duplexer 120 or the fourth duplexer 140 is not enclosed in a package, unlike the first duplexer 110 and the third duplexer 130.

The circuit substrate 200 is a multi-layer substrate formed by alternately laminating insulating layers and conductive layers. As shown in FIG. 3, the circuit substrate 200 includes a metal conductive layer as a core layer 210 that has excellent conductivity and that is relatively thick, a plurality of insulating layers 221 and conductive layers 222 that are formed on one of the main surfaces (top surface) of the core layer 210, and a plurality of insulating layers 231 and conductive layers 232 that are formed on the other main surface (bottom surface) of the core layer 210. The insulating layers 221 and 231 and the conductive layers 222 and 232 are formed on the respective main surfaces of the core layer 210 by the build-up method. Two of the conductive layers 222 that are interposed between the core layer 210 and one of the main surfaces (top surface) of the circuit substrate 200, and one of the conductive layers 232 that are interposed between the core layer 210 and the other main surface (bottom surface) of the circuit substrate 200 are respectively used as ground conductive layers 225, 226, and 235 that are provided with a reference potential (ground). The ground conductive layers 225 and 235 are the conductive layers 222 and 232 respectively closest to the core layer 210, and are connected to the core layer 210 through via conductors 241, respectively. With this configuration, the core layer 210 also serves as a ground conductor. Also, between the two ground conductive layers 225 and 226, the conductive layer 222 is interposed, and wiring formed on the conductive layer 222 serves as a stripline. On one of the main surfaces (top surface) of the circuit substrate 200, wiring 202 and conductive lands 201 for part mounting are formed. On the other main surface (bottom surface) of the circuit substrate 200, terminal electrodes 205 for connecting the circuit substrate 200 to a main substrate are formed. The lands 201 have the RFIC 160, the high-frequency power amplifiers 151 to 154, the first duplexer 110, and the third duplexer 130 soldered thereto.

In the core layer 210, penetrating holes 211 are formed to place components therein. In the penetrating holes 211, the second transmission filter 122 and the second reception filter 124 that constitute the second duplexer 120 are placed, respectively. Therefore, it is preferable that the thickness of the core layer 210 be larger than the height of the components that are placed therein. In the present embodiment, the core layer 210 is made of a metal plate, and more specifically, is made of a copper or copper alloy metal plate. In the penetrating holes 211, a gap around the component placed therein is filled with an insulator such as a resin, which is formed integrally with the insulating layers 221 and 231. On the top surfaces of the second transmission filter 122 and the second reception filter 124, terminal electrodes 122a and 124a are formed. The terminal electrodes 122a and 124a are respectively connected to the wiring conductive layer 222 and the ground conductive layer 225 through via conductors 242. The fourth duplexer 140 is embedded in the circuit substrate 200 in the same manner as the second duplexer 120.

The features of the present invention include the following: (a) some of the duplexers are embedded in the circuit substrate 200; (b) the embedded duplexer is located so as to overlap a part of the projection region of the duplexer mounted on one of the main surfaces (top surface) of the circuit substrate 200; and (c) the frequency band of the embedded duplexer and the frequency band of the duplexer mounted on one of the main surfaces (top surface) of the circuit substrate 200 are separated from each other by at least a prescribed frequency range therebetween. Specifically, (c) means that (c1) the frequency band of the transmission filter of the duplexer on the circuit substrate and the frequency band of the reception filter of the duplexer embedded in the circuit substrate are separated from each other by at least a prescribed frequency range therebetween, and (c2) the frequency band of the reception filter of the duplexer on the circuit substrate and the frequency band of the transmission filter of the duplexer embedded in the circuit substrate are separated from each other by at least a prescribed frequency range therebetween. Here, "separated from each other by at least a prescribed frequency range therebetween" means that the two frequency bands have a frequency range therebetween that is large enough to prevent a transmission signal passing through a transmission filter of one duplexer from being electromagnetically coupled with a reception filter of the other duplexer and flowing into the RFIC 160, in other words, large enough to ensure the electrical isolation. This configuration can be achieved by dividing the frequency bands that are handled by the high-frequency circuit module 100 into two groups depending on the frequency level, and using the embedded duplexer to handle the frequency band that belongs to a group different from that of the frequency band of the duplexer mounted on one of the main surfaces (top surface) of the circuit substrate 200, for example. As a method of dividing the frequency bands into groups, frequency bands higher than a certain frequency (1 GHz, for example) can be grouped into a higher range group, and frequency bands lower than the certain frequency can be grouped into a lower range group. This way, the above-mentioned two frequency bands can be separated from each other over a frequency range that is at least equal to the frequency range between the two groups.

One of the features of the present invention is that (d) a ground conductive layer is formed between the duplexer mounted on the circuit substrate 200 and the duplexer embedded in the circuit substrate 200.

One of the features of the present invention is that (e) a plurality of duplexers mounted on the circuit substrate 200 and a plurality of duplexers embedded in the circuit substrate are respectively placed so as to have a prescribed distance from each other. Here, "have a prescribed distance from each other" means that the respective duplexers are positioned so as to have spacing therebetween that is large enough to ensure the desired reception performance of the RFIC 160 even if a transmission signal passing through the transmission filter of one duplexer is electromagnetically coupled with the reception filter of the other duplexer, in other words, large enough to ensure the electrical isolation.

One of the features of the present invention is that (f) a plurality of duplexers that may be used at the same time are separately disposed; one is mounted on one of the main surfaces (top surface) of the circuit substrate 200; and the other is embedded in the circuit substrate 200. From the perspective of electrical isolation and heat dissipation, it is more preferable to place the embedded duplexer so as not to overlap the projection region of the duplexer mounted on one of the main surfaces (top surface) of the circuit substrate 200.

Below, the above-mentioned features of the high-frequency circuit module 100 according to the present embodiment will be explained. As shown in FIGS. 2 and 3, in the present embodiment, the transmission filter 122 and the reception filter 124 of the second duplexer 120 are embedded in locations that overlap the projection region of the first duplexer 110. The transmission filter 142 and the reception filter 144 of the fourth duplexer 140 are embedded in locations that overlap the projection region of the third duplexer 130. Further, the first duplexer 110 and the third duplexer 130 have a distance D1 therebetween so as not to interfere with each other. The duplexer (first duplexer 110 or third duplexer 130) mounted on the circuit substrate 200 may be used at the same time as the duplexer (second duplexer 120 or fourth duplexer 140) embedded in the circuit substrate 200.

According to such a high-frequency circuit module 100, the duplexers 120 and 140 are embedded in the circuit substrate 200, and therefore, the mounting density is improved. Also, because the embedded duplexers 120 and 140 are respectively located so as to overlap the projection regions of the respective duplexers mounted on the circuit substrate 200, a high mounting density can be achieved and various wiring lines that are connected to the duplexers can be shortened, which improves high-frequency characteristics.

Further, according to the high-frequency circuit module 100 of the present embodiment, a sufficient gap lies between the pass frequency bands of the duplexers 110 and 130 mounted on the circuit substrate 200 and the pass frequency bands of the duplexers 120 and 140 embedded in the circuit substrate 200, which can prevent the loop interference of the transmission signal with the reception circuit. That is, excellent electrical isolation can be achieved. Because the ground conductive layers 225 and 226 are formed between the duplexers 110 and 130 mounted on the circuit substrate 200 and the duplexers 120 and 140 embedded in the circuit substrate 200, the electrical isolation can be further improved. The duplexers 110 and 130 are mounted on the circuit substrate 200 so as to have at least a prescribed distance therebetween, and therefore, an excellent electrical isolation is ensured even when the frequency bands of the two duplexers partially overlap, or are close to each other.

Although not shown in FIG. 1 and the like, a matching circuit is typically mounted near each duplexer. Components of the matching circuit are mounted on the circuit substrate so that adjustments after mounting can be made with ease. In the present embodiment, although the duplexers 120 and 140 are embedded in the circuit substrate 200, components of the matching circuits that are connected to the duplexers 120 and 140 are mounted on the circuit substrate 200 in locations near the duplexers 120 and 140. That is, the matching circuit of the first duplexer 110 and the matching circuit of the second duplexer 120 are mounted close to each other. The matching circuits of the third and fourth duplexers 130 and 140 are provided in the same manner. In the present embodiment, because a sufficient gap lies between the pass frequency bands of the first and third duplexers 110 and 130 and the pass frequency bands of the second and fourth duplexers 120 and 140, and because the ground conductive layers 225 and 226 are provided, it is possible to prevent interference through the matching circuits. The frequency band of the first duplexer 110 and the frequency band of the third duplexer 130 partially overlap, or are close to each other, and therefore, the respective matching circuits thereof need to be placed apart from each other so as to prevent interference therebetween, or need to be placed so as to reduce coupling therebetween. The frequency band of the second duplexer 120 and the frequency band of the fourth duplexer 140 partially overlap, or are close to each other, and therefore, the respective matching circuits thereof need to be placed apart from each other so as to prevent interference therebetween, or need to be placed so as to reduce coupling therebetween. This way, interference through the matching circuits can be prevented.

According to the high-frequency circuit module 100 of the present embodiment, the duplexers 110 and 130 are mounted on the circuit substrate 200, and the duplexers 120 and 140 are embedded in the circuit substrate 200. Therefore, even when these duplexers are used at the same time, heat generated in the duplexers, especially in the transmission filters thereof, is not concentrated, and the heat can be released through different paths. This makes it possible to prevent the characteristics degradation caused by heat.

One embodiment of the present invention has been explained above, but the present invention is not limited to this. For example, in the above embodiment, copper and a copper alloy were given as examples of the material of the core layer 210, but any material including metals, alloys, and resins can be used. The core layer 210 may or may not have conductivity. In the above embodiment, the circuit substrate 200 was described as a substrate that has the core layer 210, which is relatively thick, but a multi-layer circuit substrate that does not have the core layer 210 may be used instead. In the above embodiment, the respective components that are mounted on the top surface of the circuit substrate 200 are exposed, but it is also possible to provide a case that covers the entire top surface or a part of the top surface of the circuit substrate 200, or to seal the top surface using a resin or the like.

In the above embodiment, the duplexers 110 and 130 that were enclosed in the packages were mounted on the circuit substrate 200, but it is also possible to mount the transmission filters and the reception filters that constitute the respective duplexers on the circuit substrate 200 as separate components. In the above embodiment, the transmission filters and the reception filters that respectively constitute the duplexers that are embedded in the circuit substrate 200 were provided as separate components, but the embedded duplexer may also be enclosed in a package. In the above embodiment, each penetrating hole 211 formed in the core layer 210 was provided with one transmission filter or one reception filter, but it is also possible to place a plurality of filters in one penetrating hole 211.

The frequency bands that were described in the above embodiment are examples, and the present invention can be implemented for other frequency bands. Also, in the above embodiment, a duplexer was given as an example of a multiplexer (antenna sharing device), but the present invention can be implemented in a multiplexer that has three or more pass frequency bands such as a triplexer.

What is claimed is:

1. A high-frequency circuit module, comprising:
   a circuit substrate that is provided with a transmission circuit and a reception circuit for a high-frequency signal;
   a first transmission filter that performs filtering in a first frequency band on a signal outputted from the transmission circuit; and
   a second reception filter that performs filtering in a second frequency band on a signal inputted into the reception circuit,
   wherein the first frequency band and the second frequency band are separated from each other by at least a prescribed frequency range therebetween,
   wherein the first transmission filter is mounted on the circuit substrate,
   wherein the second reception filter is embedded in the circuit substrate so as to overlap at least some of the first transmission filter when viewed in a plan view, and
   wherein the second reception filter is an acoustic wave filter;
   wherein the circuit substrate is a multilayer circuit substrate in which insulating layers and conductive layers are stacked, the circuit substrate having a core layer that is a conductive layer greater in thickness than another conductive layer and that functions as a ground, and
   wherein the second reception filter is disposed in a penetrating hole formed in the core layer.

2. The high-frequency circuit module according to claim 1, wherein the circuit substrate is provided with a ground conductive layer that is formed between the first transmission filter and the second reception filter.

3. The high-frequency circuit module according to claim 2, further comprising a first reception filter that performs filtering in the first frequency band on a signal inputted into the reception circuit,
   wherein the first transmission filter and the first reception filter constitute a first duplexer circuit.

4. The high-frequency circuit module according to claim 3, wherein the first duplexer circuit is enclosed in a package, and the package is mounted on the circuit substrate.

5. The high-frequency circuit module according to claim 4, wherein the circuit substrate is a multilayer circuit substrate in which insulating layers and conductive layers are stacked, the circuit substrate having a core layer that is a conductive layer greater in thickness than another conductive layer and that functions as a ground, and
   wherein the second reception filter is disposed in a penetrating hole formed in the core layer.

6. The high-frequency circuit module according to claim 3, wherein the circuit substrate is a multilayer circuit substrate in which insulating layers and conductive layers are stacked, the circuit substrate having a core layer that is a conductive layer greater in thickness than another conductive layer and that functions as a ground, and
   wherein the second reception filter is disposed in a penetrating hole formed in the core layer.

7. The high-frequency circuit module according to claim 2, wherein the circuit substrate is a multilayer circuit substrate in which insulating layers and conductive layers are stacked, the circuit substrate having a core layer that is a conductive layer greater in thickness than another conductive layer and that functions as a ground, and
wherein the second reception filter is disposed in a penetrating hole formed in the core layer.

8. The high-frequency circuit module according to claim 1, further comprising a first reception filter that performs filtering in the first frequency band on a signal inputted into the reception circuit,
wherein the first transmission filter and the first reception filter constitute a first duplexer circuit.

9. The high-frequency circuit module according to claim 8, wherein the first duplexer circuit is enclosed in a package, and the package is mounted on the circuit substrate.

10. The high-frequency circuit module according to claim 9,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second reception filter is disposed in a penetrating hole formed in the core layer.

11. The high-frequency circuit module according to claim 8,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second reception filter is disposed in a penetrating hole formed in the core layer.

12. The high-frequency circuit module according to claim 1, wherein the transmission circuit and the reception circuit use the first frequency band and the second frequency band simultaneously.

13. The high-frequency circuit module according to claim 1, wherein the transmission circuit and the reception circuit transmit and receive high-frequency signals according to frequency division duplex.

14. A high-frequency circuit module, comprising:
a circuit substrate that is provided with a transmission circuit and a reception circuit for a high-frequency signal;
a first reception filter that performs filtering in a first frequency band on a signal inputted into the reception circuit; and
a second transmission filter that performs filtering in a second frequency band on a signal outputted from the transmission circuit,
wherein the first frequency band and the second frequency band are separated from each other by at least a prescribed frequency range therebetween,
wherein the first reception filter is mounted on the circuit substrate,
wherein the second transmission filter is embedded in the circuit substrate so as to overlap at least some of the first reception filter when viewed in a plan view, and
wherein the second transmission filter is an acoustic wave filter;
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second transmission filter is disposed in a penetrating hole formed in the core layer.

15. The high-frequency circuit module according to claim 14, wherein the circuit substrate includes a ground conductive layer formed between the first reception filter and the second transmission filter.

16. The high-frequency circuit module according to claim 15, further comprising a first transmission filter that performs filtering in the first frequency band on a signal outputted from the transmission circuit,
wherein the first transmission filter and the first reception filter constitute a first duplexer.

17. The high-frequency circuit module according to claim 16, wherein the first duplexer is enclosed in a package, and the package is mounted on the circuit substrate.

18. The high-frequency circuit module according to any one of claims 17,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second transmission filter is disposed in a penetrating hole formed in the core layer.

19. The high-frequency circuit module according to any one of claims 16,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second transmission filter is disposed in a penetrating hole formed in the core layer.

20. The high-frequency circuit module according to any one of claims 15,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second transmission filter is disposed in a penetrating hole formed in the core layer.

21. The high-frequency circuit module according to claim 14, further comprising a first transmission filter that performs filtering in the first frequency band on a signal outputted from the transmission circuit,
wherein the first transmission filter and the first reception filter constitute a first duplexer.

22. The high-frequency circuit module according to claim 21, wherein the first duplexer is enclosed in a package, and the package is mounted on the circuit substrate.

23. The high-frequency circuit module according to any one of claims 22,
wherein the circuit substrate is a multilayer circuit substrate in which insulating layers and conductive layers are stacked, the circuit substrate having a core layer that is a conductive layer greater in thickness than another conductive layer and that functions as a ground, and
wherein the second transmission filter is disposed in a penetrating hole formed in the core layer.

24. The high-frequency circuit module according to any one of claims 21,
wherein the circuit substrate is a multilayer circuit substrate in which insulating layers and conductive layers are stacked, the circuit substrate having a core layer that is a conductive layer greater in thickness than another conductive layer and that functions as a ground, and wherein the second transmission filter is disposed in a penetrating hole formed in the core layer.

25. The high-frequency circuit module according to claim 14, wherein the transmission circuit and the reception circuit use the first frequency band and the second frequency band simultaneously.

26. The high-frequency circuit module according to claim 14, wherein the transmission circuit and the reception circuit transmit and receive high-frequency signals according to frequency division duplex.

* * * * *